(12) United States Patent
Matsubara et al.

(10) Patent No.: US 11,809,472 B2
(45) Date of Patent: Nov. 7, 2023

(54) SERVICE PROVIDING SYSTEM, INFORMATION PROCESSING APPARATUS, INFORMATION PROCESSING METHOD

(71) Applicants: Mayumi Matsubara, Tokyo (JP); Shintaro Kawamura, Kanagawa (JP); Atsuko Shimada, Kanagawa (JP); Shohichi Naitoh, Miyagi (JP); Yuriko Yamaya, Tokyo (JP); Shinya Iguchi, Kanagawa (JP)

(72) Inventors: Mayumi Matsubara, Tokyo (JP); Shintaro Kawamura, Kanagawa (JP); Atsuko Shimada, Kanagawa (JP); Shohichi Naitoh, Miyagi (JP); Yuriko Yamaya, Tokyo (JP); Shinya Iguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/655,403

(22) Filed: Mar. 18, 2022

(65) Prior Publication Data
US 2022/0309085 A1 Sep. 29, 2022

(30) Foreign Application Priority Data

Mar. 23, 2021 (JP) ................................ 2021-048571

(51) Int. Cl.
*G06F 16/30* (2019.01)
*G06F 16/332* (2019.01)

(52) U.S. Cl.
CPC ................ *G06F 16/3329* (2019.01)

(58) Field of Classification Search
CPC ............................ G06F 16/3329; G06F 16/35
See application file for complete search history.

(56) References Cited

U.S. PATENT DOCUMENTS 9,128,589 B1\* 9/2015 Ebert ................... G06F 1/1613
10,572,953 B1\* 2/2020 Char .................... G06Q 40/123
(Continued)

FOREIGN PATENT DOCUMENTS

JP 2002-215618 8/2002
JP 2007-264198 10/2007
(Continued)

OTHER PUBLICATIONS

Article entitled "Easy Methods to Set Multiple Reminders in Outlook 2013/2016/2019", by Hasan, dated Mar. 9, 2021 (Year: 2021).\*
(Continued)

*Primary Examiner* — Mahesh H Dwivedi
(74) *Attorney, Agent, or Firm* — IPUSA, PLLC

(57) ABSTRACT

A service providing system includes a terminal apparatus including first circuitry configured to display a topic for which an input of information is received from a user, and an information processing apparatus including second circuitry configured to collect information related to the topic from the terminal apparatus. The second circuitry of the information processing apparatus, based on topic data including a plurality of topics for which collection of information input by the user is not completed, determines, based on a content or a result of a first topic, a second topic included in the topic data as a topic to be presented to the user. The second circuitry of the information processing apparatus transmits a message including the second topic to the terminal apparatus. The first circuitry of the terminal apparatus receives the message from the information processing apparatus. The first circuitry of the terminal apparatus displays the message on a screen.

10 Claims, 15 Drawing Sheets

(56) References Cited

U.S. PATENT DOCUMENTS

| | | | |
|---|---|---|---|
| 10,943,072 B1* | 3/2021 | Jaganmohan | G06N 3/045 |
| 2015/0029535 A1 | 1/2015 | Kondoh et al. | |
| 2017/0116982 A1* | 4/2017 | Gelfenbeyn | G10L 15/22 |
| 2017/0127379 A1 | 5/2017 | Mayuzumi et al. | |
| 2017/0192950 A1* | 7/2017 | Gaither | G10L 15/22 |
| 2018/0253987 A1 | 9/2018 | Kanayama et al. | |
| 2022/0261817 A1* | 8/2022 | Ferrucci | G06N 20/00 |

FOREIGN PATENT DOCUMENTS

| | | |
|---|---|---|
| JP | 2019-185161 | 10/2019 |
| JP | 2020-135402 | 8/2020 |

OTHER PUBLICATIONS

Extended European Search Report for 22163376.1 dated Jul. 20, 2022.

* cited by examiner

FIG. 5

```
mainTopic
 {
       {
             topic = 'x DEPARTMENT OF COMPANY A'
       }
 }
TopicCandidate {
       {
             topic = 'COMPANY C'
             memoryRetentionRate = 0.34
             nextMemoryRetentionRate = 0.29
       }
       {
             topic = 'y DEPARTMENT OF COMPANY A'
             memoryRetentionRate = 0.33
             nextMemoryRetentionRate = 0.28
       }
  }
```

| topic | date | memoryRetentionRate | nextMemoryRetentionRate |
|---|---|---|---|
| y DEPARTMENT OF COMPANY A | 2020/12/22 11:30 | 0.33 | 0.28 |
| COMPANY C | 2020/12/22 16:30 | 0.34 | 0.29 |
| x DEPARTMENT OF COMPANY A | 2020/12/23 10:30 | 1 | 0.44 |
| COMPANY O | 2020/12/24 15:30 | NULL | 1 |

FIG. 15

```
mainTopic
{
    {
        topic = 'x DEPARTMENT OF COMPANY A'
        memoryRetentionRate = 1
        nextMemoryRetentionRate = 0.44
    }
}
TopicCandidate {
    {
        topic = 'COMPANY C'
        memoryRetentionRate = 0.34
        nextMemoryRetentionRate = 0.29
    }
    {
        topic = 'y DEPARTMENT OF COMPANY A'
        memoryRetentionRate = 0.33
        nextMemoryRetentionRate = 0.28
    }
}
```

SERVICE PROVIDING SYSTEM, INFORMATION PROCESSING APPARATUS, INFORMATION PROCESSING METHOD

CROSS-REFERENCE TO RELATED APPLICATION

This patent application is based on and claims priority pursuant to 35 U.S.C. § 119(a) to Japanese Patent Application No. 2021-048571, filed on Mar. 23, 2021, in the Japan Patent Office, the entire disclosure of which is hereby incorporated by reference herein.

BACKGROUND

Technical Field

Embodiments of this disclosure relate to a service providing system, an information processing apparatus, and an information processing method.

Related Art

A task-oriented interaction system is one of the applications that utilize natural language processing. For example, a system is available for achieving a predetermined task by performing question answering to automatically generate an answer to a question made by a user or operating various devices through the interaction between the user and the system. In the task-oriented interaction system, the system sometimes acquires information, and a system and a technique are known for asking the user to provide missing information to answer a question made by the user. In addition, a technique of an interaction system for assisting a user engaged in the work of continuous input of information in inputting information has recently been available.

SUMMARY

An embodiment of the present disclosure includes a service providing system. The service providing system includes a terminal apparatus including first circuitry configured to display a topic for which an input of information is received from a user, and an information processing apparatus including second circuitry configured to collect information related to the topic from the terminal apparatus, the information being input by the user. The second circuitry of the information processing apparatus, based on topic data including a plurality of topics for which collection of information input by the user is not completed, determines, based on a content or a result of a first topic, a second topic included in the topic data as a topic to be presented to the user. The second circuitry of the information processing apparatus transmits a message including the second topic to the terminal apparatus, the terminal apparatus being used by the user. The first circuitry of the terminal apparatus receives the message from the information processing apparatus. The first circuitry of the terminal apparatus displays the message on a screen.

Another embodiment of the present disclosure includes an information processing apparatus that collects from a terminal apparatus information on a topic input by a user. The information processing apparatus includes circuitry. The circuitry, based on topic data including a plurality of topics for which collection of information input by the user is not completed, determines, based on a content or a result of a first topic, a second topic included in the topic data as a topic to be presented to the user. The circuitry transmits a message including the second topic to the terminal apparatus, the terminal apparatus being used by the user.

Another embodiment of the present disclosure includes an information processing method performed by an information processing apparatus that collects from a terminal apparatus information on a topic input by a user. The information processing method includes determining, based on topic data including a plurality of topics for which collection of information input by the user is not completed, based on a content or a result of a first topic, a second topic included in the topic data as a topic to be presented to the user. The information processing method includes transmitting a message including the second topic to the terminal apparatus, the terminal apparatus being used by the user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a view illustrating an example (1) of topic attribute data according to the embodiment of the present disclosure;

FIG. 15 is a view illustrating an example (2) of topic attribute data according to the embodiment of the present disclosure.

Figure 1:
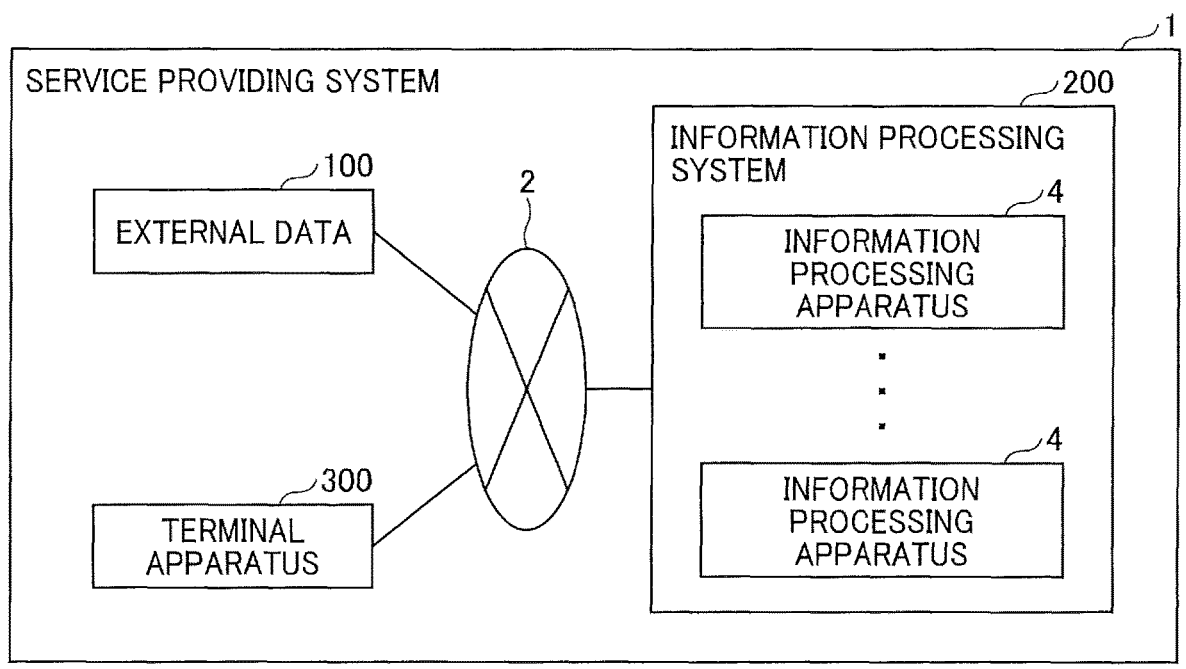
FIG. 1 is a diagram illustrating an example configuration of a service providing system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An example configuration of an information processing system according to an embodiment of the present disclosure will be described hereinafter with reference to the accompanying drawings.

Example of System Configuration:

This embodiment assists a salesperson in reporting on sales activities. In one example, after a salesperson who has visited a customer completes the sales activity for the customer, an information collection interaction system asks a client terminal for a report on the activity for the customer whom the salesperson has most recently visited.

As a premise, a user and the system interact with each other a plurality of times over a long period of time, and the interaction includes a plurality of topics. For example, a salesperson or a customer engineer visits a customer and reports on the content or result of the visit. An interaction for a plurality of visits includes a plurality of reports. In some situations, information may be acquired from a user engaged in the work of continuous input of information. In such situations, a salesperson or a customer engineer reports the content or result of each visit to the system. During an interaction between the salesperson or the customer engineer and the system about a certain report, a response from the salesperson or the customer engineer may be interrupted. For example, the salesperson or the customer engineer may have work to be preferentially performed other than generating the report. Information on a topic to be used for the interaction with the user is information on a schedule, a plan, or an outcome of the user on the topic, or a portion or all of the schedule, the plan, and the outcome of the user.

In the example described above, the system collects reports while taking into account the work to be preferentially performed by the salesperson or the customer engineer. However, since human memory fades with time, it is desirable to collect reports before the salesperson or the customer engineer forgets details.

FIG. 1 is a diagram illustrating an example configuration of a service providing system 1 according to an embodiment of the present disclosure.

An information processing system 200 is a system that receives information including a topic and information on the date and time when an event related to the topic occurred from external data 100 and interacts with a user via a network 2 using a terminal apparatus 300.

In one example, the information processing system 200 is implemented by one information processing apparatus 4. In another example, the information processing system 200 is implemented by plurality of information processing apparatuses 4 in a distributed manner. For example, each service is provided using one information processing apparatus 4. In another example, one information processing apparatus 4 provides a plurality of services. In still another example, a plurality of information processing apparatuses 4 provide one service.

In one example, the information processing system 200 supports cloud computing. The term "cloud computing" refers to the availability of resources on a network without identifying specific hardware resources. The information processing system 200 supporting cloud computing may be referred to as a cloud system. In one example, the information processing system 200 resides on the internet. In another example, the information processing system 200 resides in the on-premises network.

Further, the information processing system 200 creates screen information of a web page to be displayed on the terminal apparatus 300, and transmits the screen information. The screen information is created by Hypertext Markup Language (HTML), Extensible Markup Language (XML), Cascade Style Sheet (CSS), JavaScript (registered trademark), or any other language. For example, the web page is be provided by a web application. The web application refers to software or a mechanism thereof that is executed on the web browser and operates by coordinating a program in a programming language (for example, JavaScript (registered trademark)) operating on the web browser with a program on the web server. The web application can also dynamically change the web page.

The terminal apparatus 300 is a mobile phone such as a smartphone, a tablet terminal, a personal computer (PC), or the like. The terminal apparatus 300 is connected to the network 2 and is connected to the information processing system 200 via the network 2. The terminal apparatus 300 is loaded with a program having a screen display function, such as a web browser. The program is not limited to a web browser and may be a program dedicated to the information processing system 200 as long as the program has a function of displaying screen information received from the information processing system 200 as a screen.

The external data 100 is information obtained by referring to a server that manages a schedule, a server that accumulates activity schedules and results, or the like. The external data 100 is information on a topic collected by the information processing system 200 and is data including a schedule and result of a sales activity. The schedule of a sales activity is data including the date and time of a visit and a visit destination. The result of a sales activity is data including a visit destination and an activity result.

Hardware Configuration

Figure 2:
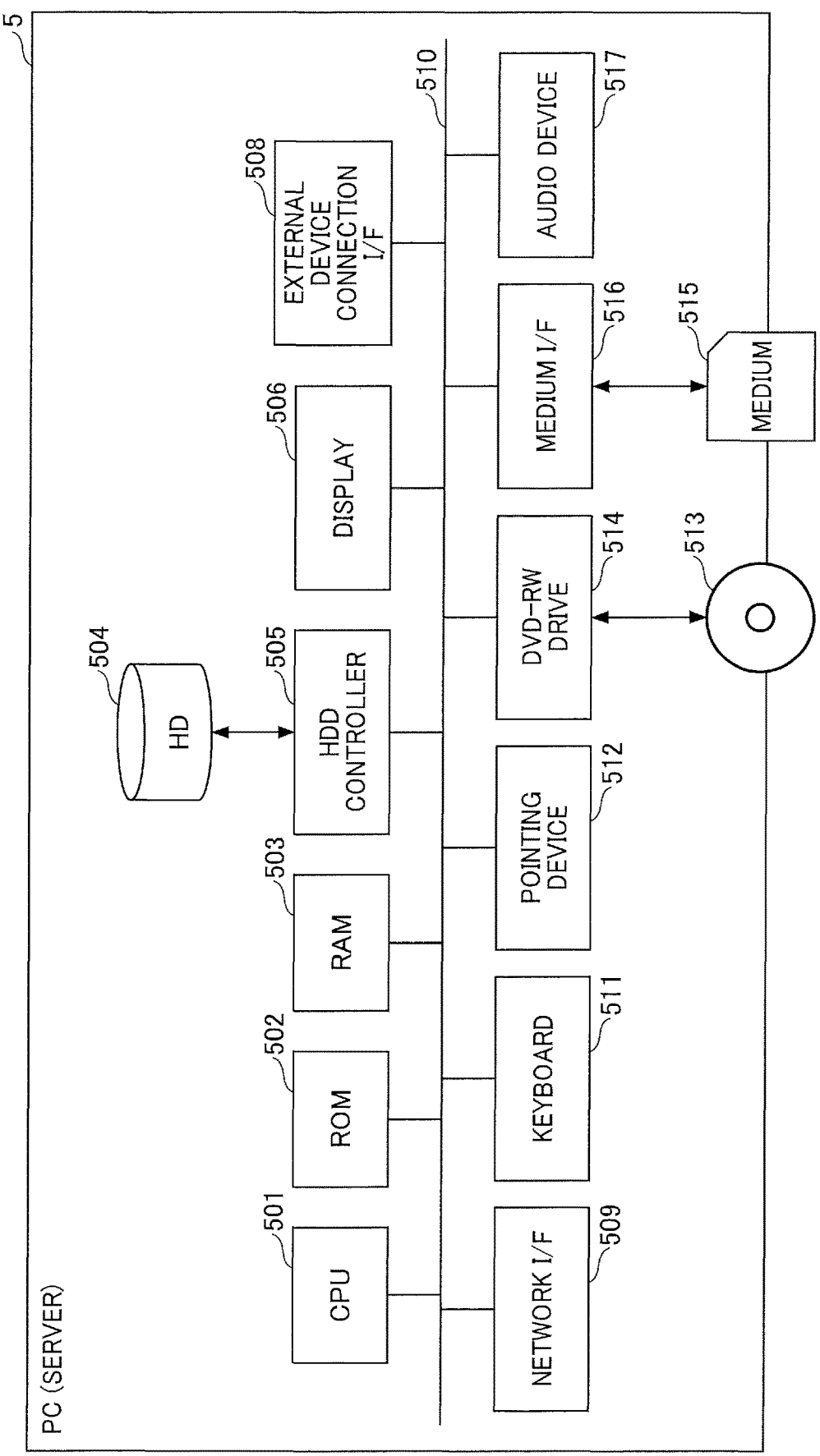
FIG. 2 is a diagram illustrating an example hardware configuration of an information processing system and a terminal apparatus according to the embodiment of the present disclosure.

FIG. 2 is a hardware configuration diagram of a PC (server) 5, which is an example of the information processing system 200 and the terminal apparatus 300. As illustrated in FIG. 2, the PC (server) 5 is implemented by a computer, and includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network IF 509, a bus line 510, a keyboard 511, a pointing device 512, a digital versatile disc rewritable (DVD-RW) drive 514, a medium I/F 516, and an audio device 517.

The CPU 501 controls the overall operation of the service providing system 1 and the terminal apparatus 30. The ROM 502 stores programs such as an initial program loader (IPL) to be used to drive the CPU 501. The RAM 503 is used as a work area for the CPU 501. The HD 504 stores various data such as a program. The HDD controller 505 controls reading and writing of various data from and to the HD 504 under control of the CPU 501. The display 506 displays various types of information such as a cursor, a menu, a window, characters, or an image. The external device connection I/F 508 is an interface that connects the PC (server) 5 to various external devices. Examples of the external devices include, but are not limited to, a universal serial bus (USB) memory and a printer. The network I/F 509 is an interface for performing data communication using the network 2. The bus line 510 is, for example, an address bus or a data bus, which electrically couples the components illustrated in FIG. 2, such as the CPU 501.

Further, the keyboard 511 is an example of an input device including a plurality of keys to be used for inputting characters, numerical values, various instructions, or the like. The pointing device 512 is an example of an input device that allows a user to select or execute various instructions, select a target for processing, or move the cursor being displayed. The DVD-RW drive 514 reads and writes various data from and to a DVD-RW 513, which is an example of a removable recording medium. The recording medium is not limited to a DVD-RW and may be a digital versatile disc-recordable (DVD-R) or the like. The medium I/F 516 controls reading and writing (storing) of data from and to a recording medium 515 such as a flash memory. The audio device 517 is a device that performs audio input via a microphone or the like and audio output via a speaker or the like.

Functions

Figure 3:
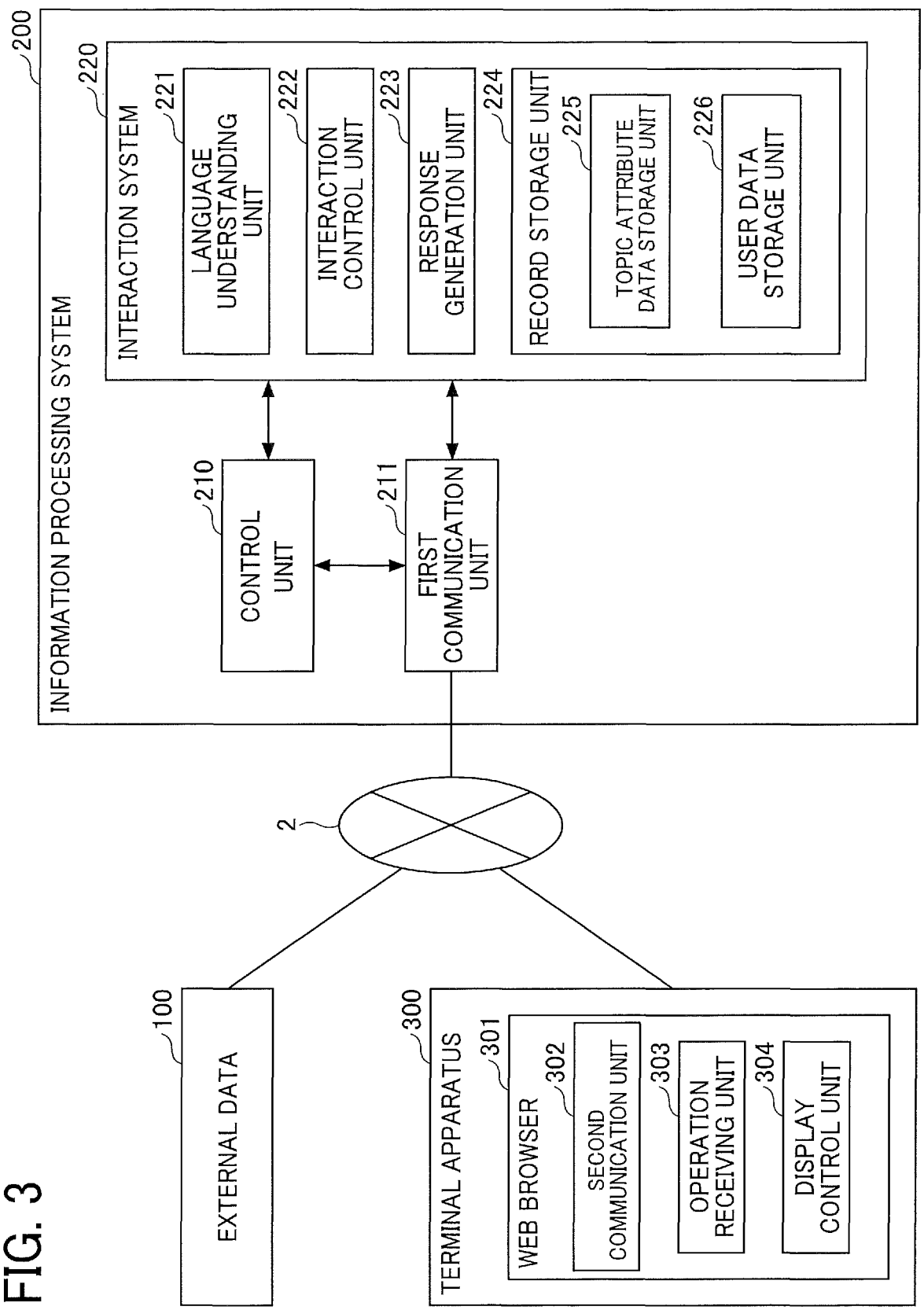
FIG. 3 is a diagram illustrating an example functional configuration of the information processing system according to the embodiment of the present disclosure.

A functional configuration of the service providing system 1 according to this embodiment will be described with reference to FIG. 3. FIG. 3 is a diagram illustrating an example functional configuration of the service providing system 1 according to this embodiment.

The information processing system 200 includes an interaction system 220 that holds topic attribute data, and uses this information to interact with a user. The topic attribute data is information on a topic of a conversation between the user and the information processing system 200 and includes, as information, an index indicating the degree of memory retention of the user with respect to the topic. For example, when the user is a salesperson, the topic is information on a visit destination for which the activity has been completed and a visit destination for which the activity is scheduled. The index indicating the degree of memory retention of the user with respect to a topic (hereinafter sometimes referred to simply as the "degree of the user's memory retention") is calculated using, for example, information related to the date and time of a visit, the date and time of the end of the visit, the date and time when the topic is first presented to the user, or the date and time of the end of an interaction during which the topic is first presented to the user. The older the information related to a visit, the lower the degree of the user's memory retention.

A control unit 210 has a function of generating and updating data included in the interaction system 220. The control unit 210 has the following functions:

estimating and calculating the degree of memory retention of the user with respect to a topic presented to the user, and generating and updating information thereof;

determining the state of acquisition of items of information (such as the date and time of a business report and the name of a customer) determined in advance for a topic presented to or raised in an interaction with the user;

receiving information of a topic to be used for an interaction with the user and an interaction history, or either information of a topic to be used for an interaction with the user or an interaction history;

extracting one or more topics that can possibly be presented to or raised in an interaction with the user, based on the information described above, estimating the degree of a person's memory with regard to each topic or the degree to which the user retains each topic in memory, the degree of information retention, or the freshness of each topic, and controlling a topic to be presented to the user, based on the estimation result; and determining the state of an interaction with the user, and determining whether the topic is completed or whether the topic is interrupted.

holding the information used in the functions described above. In another example, the information is held in the external data 100 or in the information processing system 200. In still another example, an interaction control unit 222 described below implements some or all of the functions.

A first communication unit 211 has a data transmitting/receiving function of transmitting and receiving information on a trigger, an activity schedule, and an activity result, and transmits and receives data to and from the external data 100 and the terminal apparatus 300 via the network 2.

The interaction system 220 includes a language understanding unit 221, the interaction control unit 222, a response generation unit 223, and a record storage unit 224. The record storage unit 224 includes a topic attribute data storage unit 225 and a user data storage unit 226, and stores data to be used when the interaction system 220 interacts with a user.

The topic attribute data storage unit 225 holds topic attribute data. The topic attribute data includes information on a topic of a conversation between the user and the interaction system 220, and information indicating the topic and the degree of memory retention of the user with respect to the topic. The topic attribute data storage unit 225 also holds a topic for which the state of acquisition is not fully or partially completed, and information obtained by estimating the degree of a person's memory with regard to the topic or the degree to which the user retains the topic in memory, the degree of information retention, or the freshness of the topic. The data held by the topic attribute data storage unit 225 is generated and updated by the control unit 210 or the interaction control unit 222.

The user data storage unit 226 holds user data. The user data includes information related to the personal attribute of the user. Examples of the information include the user's name, the user's boss, and the user's contact address.

The language understanding unit 221 understands user information in audio, text, or any other form, which is input from the terminal apparatus 300. The language understanding unit 221 also has the following functions:

receiving a response of the user from the terminal apparatus 300 connected via the network 2, and determining or identifying a reception result, or determining and identifying the reception result;

understanding the content of a topic to extract information corresponding to a predetermined item of information; and classifying, determining, or identifying one or more topics to be handled in an interaction with the user.

The interaction control unit 222 has a function of transmitting and receiving data between the control unit 210 and the terminal apparatus 300, selecting an interaction to be performed by the interaction system 220, executing the interaction, and controlling the interaction, and a function of detecting and updating the state of an interaction currently performed with the user.

The response generation unit 223 generates or selects information such as a response to the user or a message to be transmitted from the information processing system 200 to the user. The generated message is transmitted to the terminal apparatus 300 by the interaction control unit 222. The language understanding unit 221 also has the following functions:

generating or selecting a natural language to present to the user; and generating a natural language based on or including information obtained by estimating the degree of a person's memory, the degree of a person's memory with regard to a topic, the degree to which the user retains the topic in memory, the degree of information retention, or the freshness of the topic.

The first communication unit 211 is implemented by, for example, the network I/F 509 operating under control of the CPU 501 executing the program. Each of the control unit 210, the language understanding unit 221, the interaction control unit 222, and the response generation unit 223 is implemented by, for example, the CPU 501 executing the program. Each of the record storage unit 224, the topic attribute data storage unit 225, and the user data storage unit 226 is implemented by, for example, HD 504.

The terminal apparatus 300 includes a second communication unit 302, an operation receiving unit 303, and a display control unit 304, which are implemented by a web browser 301. The web browser 31 downloads screen information from the information processing system 200. The individual functional units are functions or units implemented by the CPU 501 executing instructions included in one or more programs included in the downloaded screen information.

The second communication unit 302 transmits and receives information and the like related to an application to and from the information processing system 200. The operation receiving unit 303 receives various operations of the user on various screens displayed on the display 506. The display control unit 304 interprets screen information of various screens to display screens on the display 506. In another example, the second communication unit 302, the operation receiving unit 303, and the display control unit 304 are implemented by a native application instead of the web browser 301.

Operation

Figure 4:
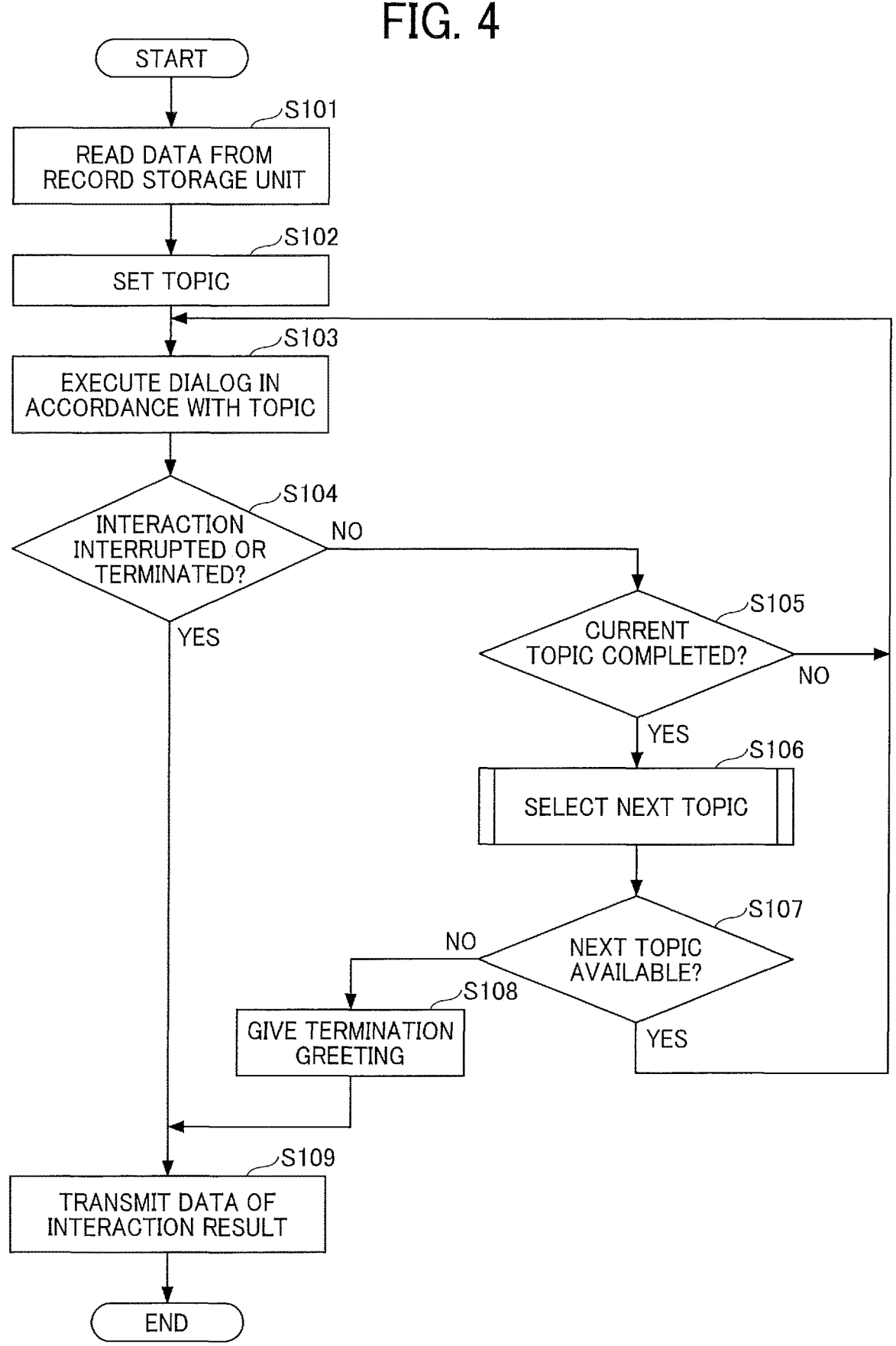
FIG. 4 is a flowchart illustrating an example process performed by an interaction system according to the embodiment of the present disclosure.

FIG. 4 is a flowchart illustrating an example process performed by the interaction system 220 according to this embodiment. The processing of the steps illustrated in FIG. 4 will be described hereinafter.

S101: The interaction control unit 222 reads the topic attribute data held in the topic attribute data storage unit 225 and the user data held in the user data storage unit 226.

S102: The interaction control unit 222 reads a topic on which the interaction system 220 is to interact with the user from the topic attribute data storage unit 225, or sets the topic.

S103: The interaction control unit 222 executes a dialog corresponding to the topic set in S102 and starts an interaction with the user.

S104: The interaction control unit 222 determines whether the interaction is interrupted or terminated, based on the information on the state of the interaction. This processing is to determine whether the user has left the interaction with the interaction system 220. If the determination result is "NO", the process transitions to S105. If the determination result is "YES", the process transitions to S109.

S105: If the determination result is "NO" in step S104, the interaction control unit 222 determines whether the current topic is completed, using the managed state of the interaction. This processing is to determine whether the topic of the interaction currently performed between the user and the interaction system 220 continues or is completed. If the determination result is "NO", the process transitions to S103. If the determination result is "YES", the process transitions to S106. If the determination result is "NO", the current topic still continues, and the process returns to S103 to continue the interaction based on the selected dialog. If the determination result is "YES", the process transitions to S106 to examine a topic to be presented next.

S106: Since the most recent topic is completed, the interaction control unit 222 selects the next topic of the interaction with the user. In one example, the interaction control unit 222 selects the next topic (a second topic) based on a content or a result of the most recent topic (a first topic). The detailed process will be described with reference to a flowchart below. One or two or more topics may be presented from within the candidate topics. Two or more topics may be sequentially presented or presented in such a manner that the user selects a plurality of topics.

S107: When the next topic is selected in S106, the interaction control unit 222 determines whether a topic to be presented to the user is available. If a topic to be presented is available ("YES" in S107), the process transitions to S103, and the interaction control unit 222 activates a dialog corresponding to the topic. If a topic to be presented is not available ("NO" in S107), the process transitions to S108.

S108: This step is to give a greeting to terminate the interaction with the user. The response generation unit 223 generates a text message or a voice message in natural language, and transmits the generated message to the terminal apparatus 300 of the user via the first communication unit 211. The second communication unit 302 of the terminal apparatus 300 receives the message. When the message is a text message, the display control unit 304 displays the text message on the display 506. When the message is a voice message, the display control unit 304 plays back the voice message using the audio device 517.

S109: With a change in the state of each topic during the current interaction, the control unit 210 or the interaction control unit 222 updates the information on the state of each topic, and transmits content reported to the information processing system 200 by the user, indicating whether the user has completed a report on the topic, to the record storage unit 224. The record storage unit 224 transmits the topic attribute data to the topic attribute data storage unit 225 and transmits the user data to the user data storage unit 226 to store the topic attribute data and the user data.

Then, the process illustrated in FIG. 4 ends. The process executed by the interaction control unit 222 may be performed by the control unit 210.

Data

FIG. 5 illustrates an example of the topic attribute data read by the interaction control unit 222 in S101 illustrated in FIG. 4. In S102, a topic on which the interaction system 220 is to interact with the user is read. The topic is "x Department of Company A", which is the value of a topic in "mainTopic" illustrated in FIG. 5. In S106, the next topic on which the interaction system 220 is to interact with the user is selected. Two candidates of the next topic are available: "Company C" and "y Department of Company A", which are the values of topics in "TopicCandidate" illustrated in FIG. 5. Each of the topics in "TopicCandidate" includes the following two types of memory retention rates, each of which is an index indicating the degree of the user's memory with regard to the topic. One type is memoryRetentionRate, which is a memory retention rate at a time when the topic in "mainTopic" is presented to the user. "memoryRetentionRate" is one example of a first index. The other type is nextMemoryRetentionRate, which is the memory retention rate of the topic on which the interaction system 220 interacts with the user at the earliest time after the conversation in which the topic in "mainTopic" is presented is completed. "nextMemoryRetentionRate" is one example of a second index. A more detailed description will be provided with reference to FIG. 6.

Figures 6, 7:
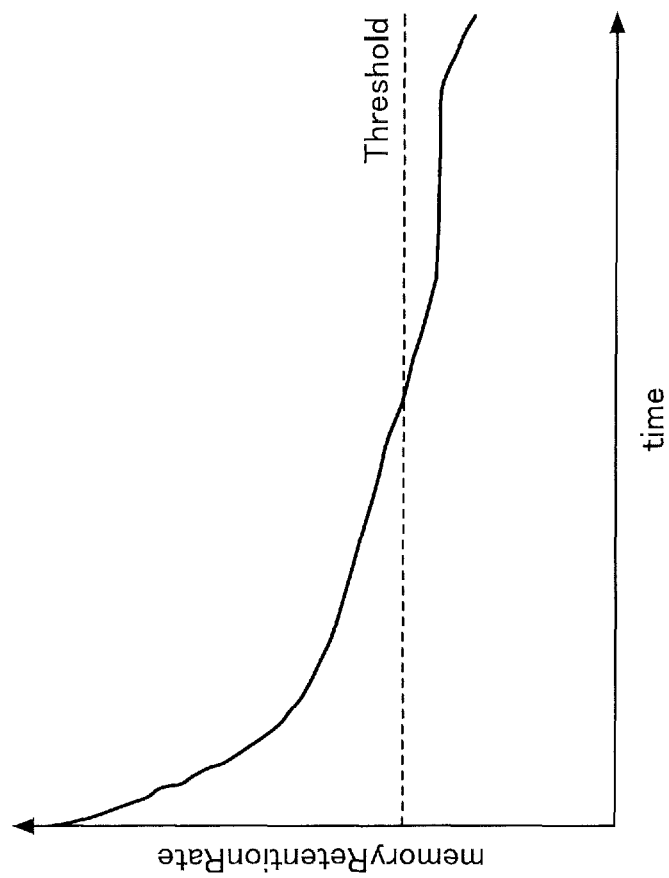
FIG. 6 is a table illustrating information used to generate topic attribute data according to the embodiment of the present disclosure.
FIG. 7 is a graph illustrating a function related to a memory retention rate according to the embodiment of the present disclosure.
Figure 8A:
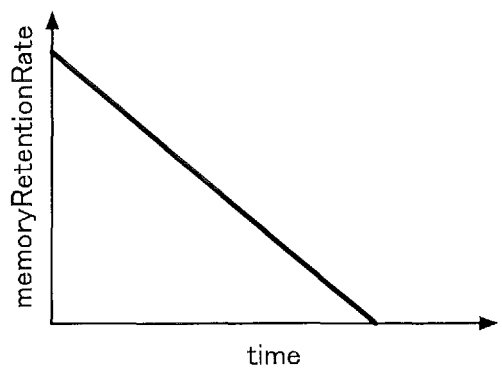
FIG. 8A to FIG. 8G are graphs illustrating various examples of the function related to the memory retention rate according to the embodiment of the present disclosure.
Figure 8B:
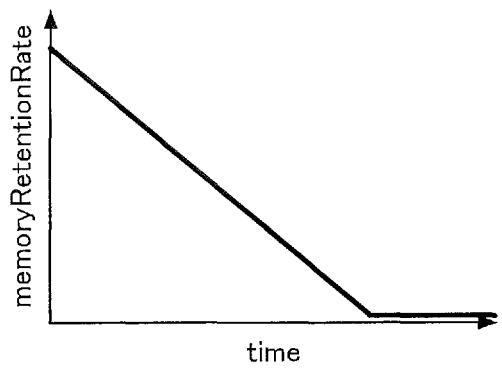
Figure 8C:
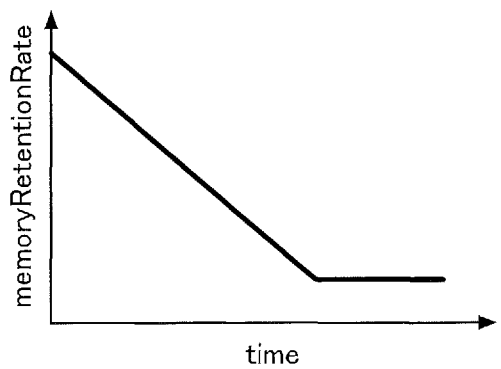
Figure 8D:
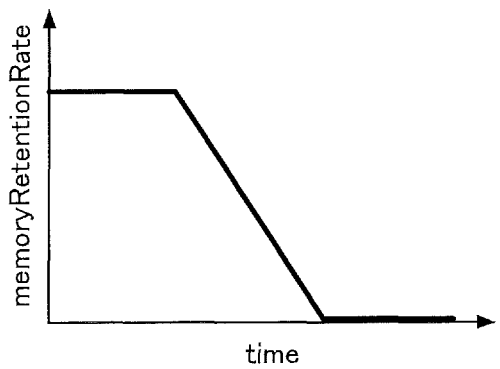
Figure 8E:
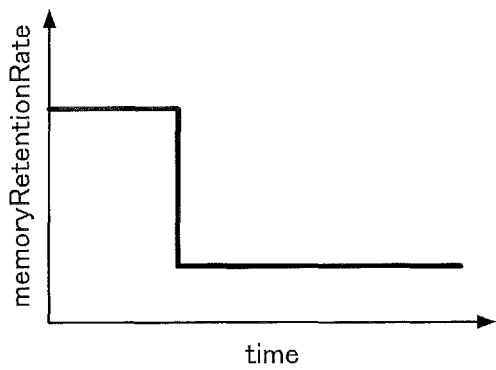
Figure 8F:
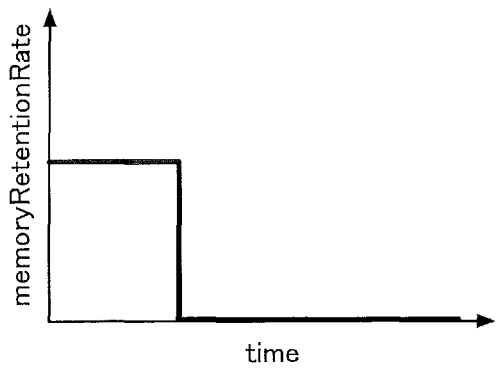
Figure 8G:
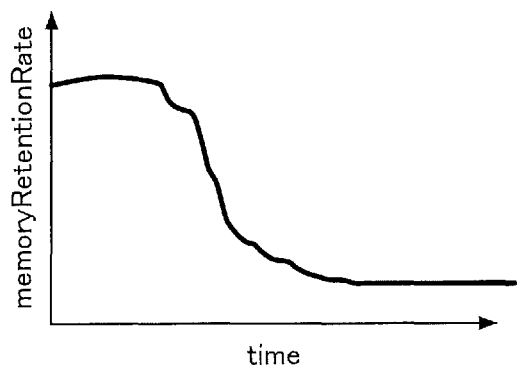

FIG. 6 is a table illustrating information used to generate topic attribute data according to this embodiment, and illustrates activity schedules and activity results of a certain salesperson at a certain point in time. Specifically, it is assumed that the interaction system 220 asks the user for a result of the activity for x Department of Company A at 10:30 on Dec. 23, 2020 (2020 Dec. 23) and the report on the result is completed. Since the user has not completed the reports on the activities for y Department of Company A and Company C at this point in time, the two topics are presented to the user while the user's memory is maintained to some extent. It is further assumed that the user is scheduled to perform the activity for Company O after the completion of the activity for x Department of Company A and that the interaction system 220 is scheduled to ask the user for the result at 15:30 on Dec. 24, 2020 (2020 Dec. 24) immediately after the activity for Company O is completed.

Next, the items "topic", "date", "memoryRetentionRate", and "nextMemoryRetentionRate" of the table illustrated in FIG. 6 will be described.

The item "topic" is information on a topic to be presented to the user by the interaction system 220 and indicates information on a visit destination to be reported. The information includes, for example, information on a visit destination for which the report is not completed and a visit destination scheduled to be visited today. Since a topic for which the report has been completed is removed from the illustrated table, the table is updated each time a conversation between the interaction system 220 and the user is completed or each time a conversation between the interaction system 220 and the user is started.

The item "date" indicates the date and time when the topic is started, when the topic is completed, or when the topic is scheduled to be provided.

The item "memoryRetentionRate" indicates the degree of memory retention of the user with respect to the topic. The memory retention rate is calculated using a relationship between a reference time and a time at which a topic or an event related to the topic occurs or ends. For example, a value obtained by using the difference between a visit completion time and a reference time is set to 1 when the visit completion time matches the reference time, and the value decreases with time. The memory retention rate is calculated using a relationship between a reference time and a time at which a topic or an event related to the topic occurs or ends. In this embodiment, a threshold value is set for the memory retention rate, and the topic is presented again to the user before the memory retention rate falls below a predetermined criterion. In FIG. 6, the reference date and time is 10:30 on Dec. 23, 2020 (2020 Dec. 23 10:30).

The item "nextMemoryRetentionRate" indicates the degree of forgetting at a time when the next topic is presented in a case where the topic is not presented at the present point in time. For example, in FIG. 6, the memory retention rates of the respective topics at 15:30 on Dec. 24, 2020 (2020 Dec. 24), which is the earliest time after the reference date and time (2020 Dec. 23 10:30) for calculating the memory retention rates, are calculated.

The value of memoryRetentionRate may be expressed by Equation (1) below.

$$\text{memoryRetentionRate} = f(t_c - t_x) \quad \text{Equation (1)}$$

In Equation (1), $t_c$ denotes information on the point in time or the date and time used as a reference to calculate the degree of forgetting of a topic at a certain point in time. That is, $t_c$ corresponds to the date and time when the most recent conversation is performed or the current date and time. In Equation (1), $t_x$ corresponds to the date and time when the user experienced an event related to a certain topic. For example, $t_x$ corresponds to the date and time when a schedule for a certain topic was implemented or the date and time when a certain topic was asked of the user first. The function f will be described below. Equation (1) is applicable to the calculation of the value of nextMemoryRetentionRate as well as the value of memoryRetentionRate. Equation (1) may also be applied to a numerical value indicating the freshness of information on a topic, a numerical value indicating loss of memory of information on a certain topic, or the like.

FIG. 7 is a graph illustrating an example of the function f in Equation (1) indicating the memory retention rate. The function is represented by a function of an elapsed time from a certain reference point in time, and has a characteristic such that the function has a smaller value for a topic that is older relative to the certain reference point in time. The function is, for example, a curve of forgetting in human memory. For example, the forgetting curve, developed by Hermann Ebbinghaus, may be used.

FIG. 8 presents graphs illustrating various examples of the function related to the memory retention rate. The memory retention rate has a characteristic such that the memory retention rate has a smaller value for a topic that is older relative to a certain reference point in time, and may be expressed by, for example, a linear function, or may be a function obtained by multiplying a step function by −1, or a combination of a linear function, a step function, and the function illustrated in FIG. 5 and multiplied or added by a constant.

The memory retention rate is also referred to as an estimated value, and may be estimated or calculated by the following methods.

The memory retention rate is calculated using the time at which the user is spoken to as a reference point in time.

The memory retention rate is calculated using a function of time.

The memory retention rate is estimated based on a relationship between human memory and time (for example, memory retention decreases with time).

The memory retention rate is estimated using a function having a characteristic such that at least a portion or all of the function decreases with time relative to a reference point in time.

The memory retention rate is estimated using a function created based on a forgetting curve related to human memory, a linear function, a step function, or an affine function.

When two topics including a first topic and a second topic are presented in order of presentation time, the estimated value of the second topic is calculated based on a reference point in time determined based on information on the time at which the first topic is presented to the user.

The memory retention rate is calculated using, as a reference, a time that is determined based on a schedule or plan for a topic and at which the topic is presented to the user.

When one topic has estimated values of two or more kinds of information (for example, memoryRetentionRate as a first estimated value and nextMemoryRetentionRate as a second estimated value), the estimated values are calculated using, as a reference point in time for the second estimated value, a later point in time at which the topic is presented to the user again.

The memory retention rate or the estimated value may be used to select or present a topic to the user as follows.

The topic to be selected is assumed to belong to a range of a predetermined threshold value.

Topics are selected or presented to the user in descending order of memory retention rate or estimated value calculated using as a reference the time at which the topic is presented to the user.

A topic for which the memory retention rate or the estimated value (for example, nextMemoryRetentionRate) calculated using as a reference a later time than the time at which the topic is presented to the user falls below or is less than or equal to a certain threshold value is selected or ranked such that such a topic is presented earlier.

The methods described above are used in combination.

Next, an example of the process of "selecting the next topic" in S106 illustrated in FIG. 4 will be described with reference to a flowchart illustrated in FIG. 9. The process starts if the determination result is "YES" in S105 illustrated in FIG. 4 for determining whether the current topic is completed. The processing of the steps illustrated in FIG. 9 will be described.

S201: The interaction control unit 222 reads the topic attribute data stored in the topic attribute data storage unit 225 to acquire a next candidate topic. Specific values to be used are the values in "TopicCandidate" illustrated in FIG. 5.

S202: The interaction control unit 222 refers to the value of memoryRetentionRate of each topic in "TopicCandidate" illustrated in FIG. 5 and extracts a topic for which the value is greater than or equal to a threshold value. The threshold value is assumed to be set to 0.285. The example illustrated in FIG. 5 includes two topics, namely, Company C and y Department of Company A, and the values of memoryRetentionRate of the two topics are 0.34 and 0.33, respectively, which are greater than or equal to the threshold value. As a result, the two topics, namely, Company C and y Department of Company A, are extracted.

S203: The interaction control unit 222 calculates the number of topics extracted in S202 and determines whether more than one topic is extracted. Since two topics are extracted in the example illustrated in FIG. 5, the determination result is "YES" in S203. If more than one topic is not extracted, that is, if the number of extracted topics is less than or equal to one, the determination result is "NO". If the determination result is "YES", the process transitions to S204. If the determination result is "NO", the process transitions to S207.

S204: The interaction control unit 222 refers to the value of nextMemoryRetentionRate of each topic in "TopicCandidate" illustrated in FIG. 5 and determines whether a topic for which the value is less than a threshold value is included. For example, when the threshold value is 0.285, in the example illustrated in FIG. 5, the value of nextMemoryRetentionRate for the topic related to y Department of Company A is 0.28, which is less than the threshold value. Thus, in the example illustrated in FIG. 5, the determination result is "YES" in S204. If the determination result is "YES", the process transitions to S205. If the determination result is "NO", the process transitions to S206.

S205: The interaction control unit 222 selects a topic for which the value of nextMemoryRetentionRate in "TopicCandidate" illustrated in FIG. 5 is less than a threshold value. The selected topic is a topic to be presented to the user next. In the example illustrated in FIG. 5, y Department of Company A is selected as the next topic. One or two or more topics may be selected here. The interaction control unit 222 selects a topic for which the value of memoryRetentionRate is greater than or equal to the threshold value and the value of nextMemoryRetentionRate is less than the threshold value. This step is intended to preferentially select a topic for which the memory retention rate is less than the threshold value at a time when the interaction system 220 next speaks to the user. This makes it possible to present a topic to the user while the topic is remembered to a certain extent or more. The process ends with the output of this step. After the process ends, the process transitions to the processing of S107 illustrated in FIG. 4. The threshold value used in S204 and the threshold value used in S205 may be set to be different from each other.

S206: This step is performed by the interaction control unit 222 if the determination result is "NO" in S204, that is, if a topic for which the memory retention rate is less than the threshold value is not included at a time when the interaction system 220 next speaks to the user. A plurality of topics for which the memory retention rate is greater than or equal to the threshold value may be included at a time when the interaction system 220 next speaks to the user. For example, a topic having the highest value of memoryRetentionRate in FIG. 5 is selected because the user can more easily respond on a topic fresher in memory. In this step, consideration is given to the fact that the user more easily responds on a topic fresher in memory. Any other method may be used. For example, all topics for which the value of memoryRetentionRate is greater than or equal to the threshold value may be selected, topics may be selected in ascending order of the value of memoryRetentionRate, or topics may be selected in descending order of the value of memoryRetentionRate. The process ends with the output of this step. After the process ends, the process transitions to the processing of S107 illustrated in FIG. 4.

S207: This step is performed by the interaction control unit 222 if it is determined in S203 that the number of extracted topics is less than or equal to one. This step is to determine whether the number of extracted topics is one or zero. If the number of extracted topics is one, the process transitions to S208. If the number of extracted topics is not one, the process transitions to S209.

S208: This step is performed by the interaction control unit 222 when only one candidate topic is selected. Accordingly, the currently extracted topic is selected as the next topic. The process ends with the output of this step. After the process ends, the process transitions to the processing of S107 illustrated in FIG. 4.

S209: If the number of extracted topics is not one in S207, the interaction control unit 222 generates information indicating that there is no topic to be presented as the next topic. The process ends with an output indicating no next topic. After the process ends, the process transitions to the processing of S107 illustrated in FIG. 4.

Figure 9:
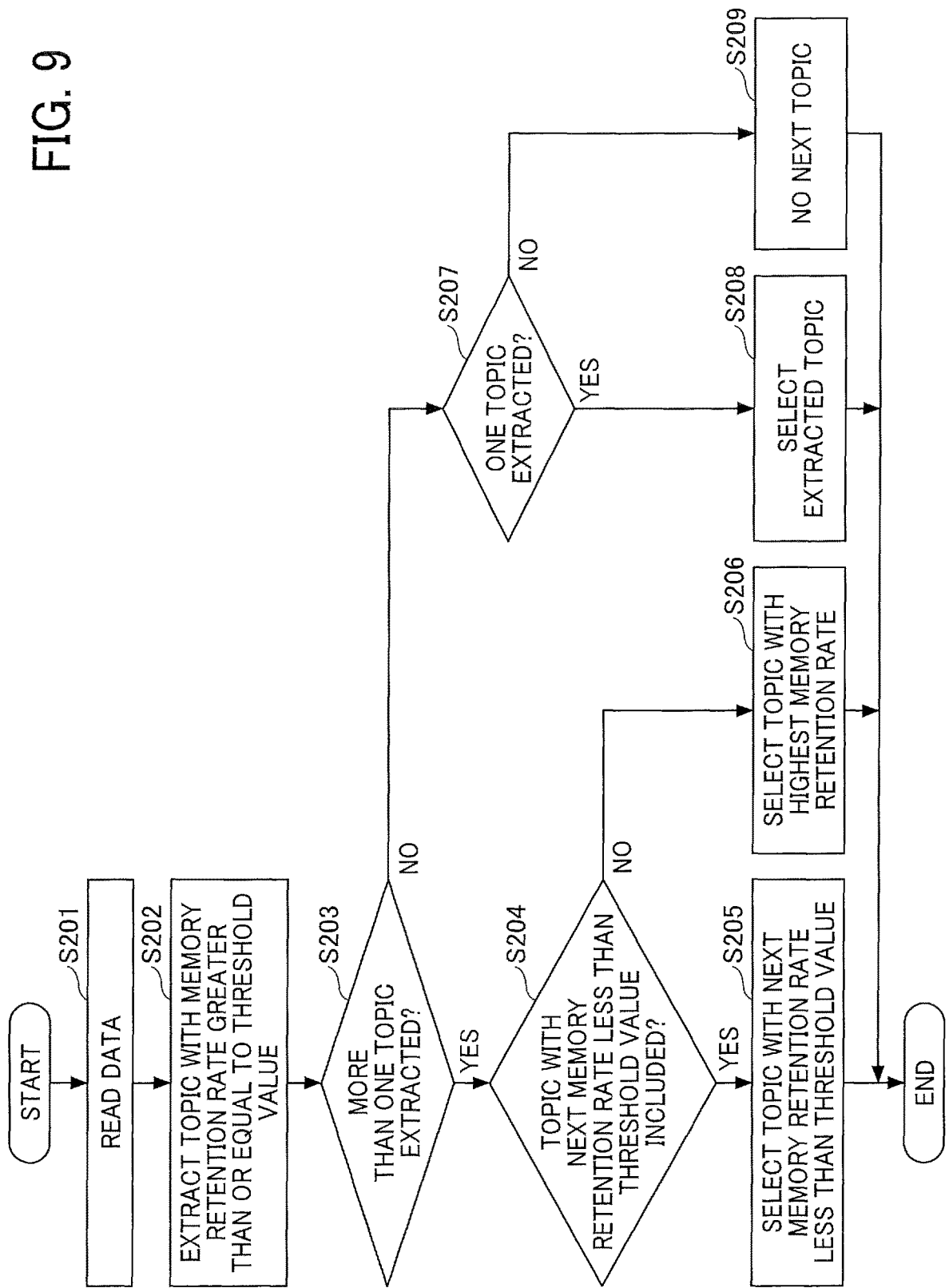
FIG. 9 is a flowchart illustrating topic selection according to the embodiment of the present disclosure.

Then, the process illustrated in FIG. 9 ends. The process executed by the interaction control unit 222 may be performed by the control unit 210.

Examples of Display Content

Figure 10:
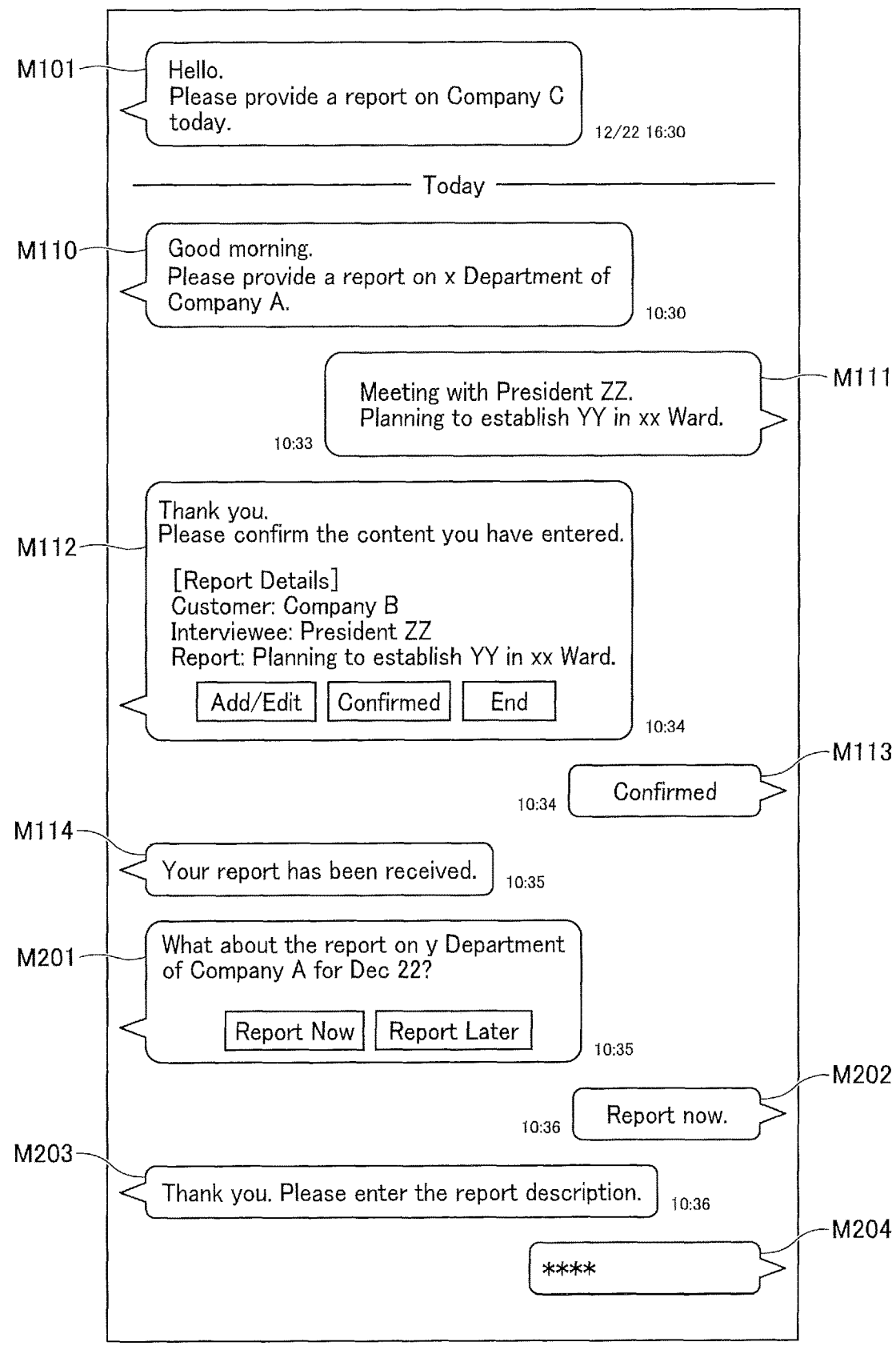
FIG. 10 is a view illustrating an example (1) of display content according to the embodiment of the present disclosure.

Next, display content to be displayed on the terminal apparatus 300 by the information processing system 200 will be described. FIG. 10 illustrates an example (1) of the display content.

In the illustrated example, after the information processing system 200 prompts the user to report on the activity for x Department of Company A, the result of the activity is reported, and the information processing system 200 presents a topic for which the report is not completed. Messages M101, M110, M112, M114, M201, and M203 are submitted by the information processing system 200, and the rest are responses from the user. The messages M101, M110, M112, M114, M201, and M203 include a message for presenting a topic, a message indicating that the topic is completed, and a message for again presenting a topic previously presented to the user. In one embodiment, a message indicating that a topic is completed is displayed at a time later than a time at which a message for presenting the topic is displayed, and a message for again presenting a topic previously presented to the user is presented to the user after the message indicating that the first presented topic is completed. In the example illustrated in FIG. 10, the message M101 and the message 110 are messages that the information processing system 200 presents as a first topic to the user. In one embodiment, in the message M110, for example, a greeting and a topic on which the information processing system 200 and the user are about to speak are described in natural language. In the example illustrated in FIG. 10, the message M114 indicates that the topic presented by the information processing system 200 is completed. Examples of the message M114 include a message indicating completion of a report on the topic presented by the information processing system 200, a message indicating receipt of the report, and a message indicating presentation of a next action such as registration of the report in another system. In the example illustrated in FIG. 10, the message M201 indicates presentation of a topic given in a previous question presented to the user, as a second topic, after the user is notified of completion of the first topic as presented in the message M114.

A message to be transmitted from the information processing system 200 is created by the response generation unit 223 and transmitted to the terminal apparatus 300 from the first communication unit 211. The second communication unit 302 of the terminal apparatus 300 transmits the received message to the display control unit 304, and the display control unit 304 displays the message on the display 506. The operation receiving unit 303 receives an input from the user and transmits a message entered by the user to the second communication unit 302. The second communication unit 302 transmits the received message to the first communication unit 211 of the information processing system 200. In the example illustrated in FIG. 10, each message is in text format, but may be a voice message. In the case of a voice message, the terminal apparatus 300 inputs and outputs a voice using the audio device 517.

The processing of each message will be described hereinafter.

M101: The interaction control unit 222 determines, based on the information on the topic attributes illustrated in FIG. 6, that a message that asks the user for a report on Company C, such as "Hello. Please provide a report on Company C today", is to be submitted at 16:30 on December 22 (December 22). The first communication unit 211 transmits the message to the terminal apparatus 300.

M110: The interaction control unit 222 determines, based on the information on the topic attributes illustrated in FIG. 6, that a message that asks the user for a report on x Department of Company A, such as "Good morning. Please provide a report on x Department of Company A", is to be submitted today (December 23) at 10:30. The first communication unit 211 transmits the message to the terminal apparatus 300.

M111: The user inputs the report "Meeting with President ZZ. Planning to establish YY in xx Ward" at 10:33 from the operation receiving unit 303 of the terminal apparatus 300. The second communication unit 302 of the terminal apparatus 300 transmits the input report to the first communication unit 211 of the information processing system 200. The language understanding unit 221 analyzes and understands the content of the received report.

M112: The interaction control unit 222 determines that a message that asks the user to confirm the content of the received report, such as "Thank you. Please confirm the content you have entered. 'Report Details', 'Customer: Company B', 'Interviewee: President ZZ', 'Report: Planning to establish YY in xx Ward', 'Add/Edit', 'Confirmed', and 'Exit'", is to be submitted at 10:34. The first communication unit 211 transmits the message to the terminal apparatus 300.

M113: The user selects "Confirmed" at 10:34 as a response from the operation receiving unit 303 of the terminal apparatus 300. The second communication unit 302 of the terminal apparatus 300 transmits the selected response to the first communication unit 211 of the information processing system 200.

M114: The interaction control unit 222 determines that a message "Your report has been received" in response to the received response is to be submitted at 10:35. The first communication unit 211 transmits the message to the terminal apparatus 300. Further, the interaction control unit 222 instructs the record storage unit 224 to update the topic attribute data and the user data, based on the content of the report. The interaction control unit 222 further determines, based on the content of the report, that the topic of Company B is completed.

M201: Immediately after completion of the topic of Company B, the interaction control unit 222 determines that a message that asks the user for a report on y Department of Company A, which is a pending topic, such as "What about the report on y Department of Company A for December 22? 'Report Now', and 'Report Later'", is to be submitted at 10:35. The first communication unit 211 transmits the message to the terminal apparatus 300.

M202: The user selects "Report Now" at 10:36 as a response from the operation receiving unit 303 of the terminal apparatus 300. The second communication unit 302 of the terminal apparatus 300 transmits the selected response to the first communication unit 211 of the information processing system 200.

M203: The interaction control unit 222 determines that the message "Thank you. Please enter the report description" is to be submitted at 10:36 in response to the response from the user. The first communication unit 211 transmits the message to the terminal apparatus 300.

M204: The user starts to input the report from the operation receiving unit 303 of the terminal apparatus 300.

The processing of the messages illustrated in FIG. 10 has been described above. In one example, the process executed by the interaction control unit 222 are performed by the control unit 210. The language understanding unit 221 understands information on a topic attribute as needed, and the response generation unit 223 creates a message.

Figure 11:
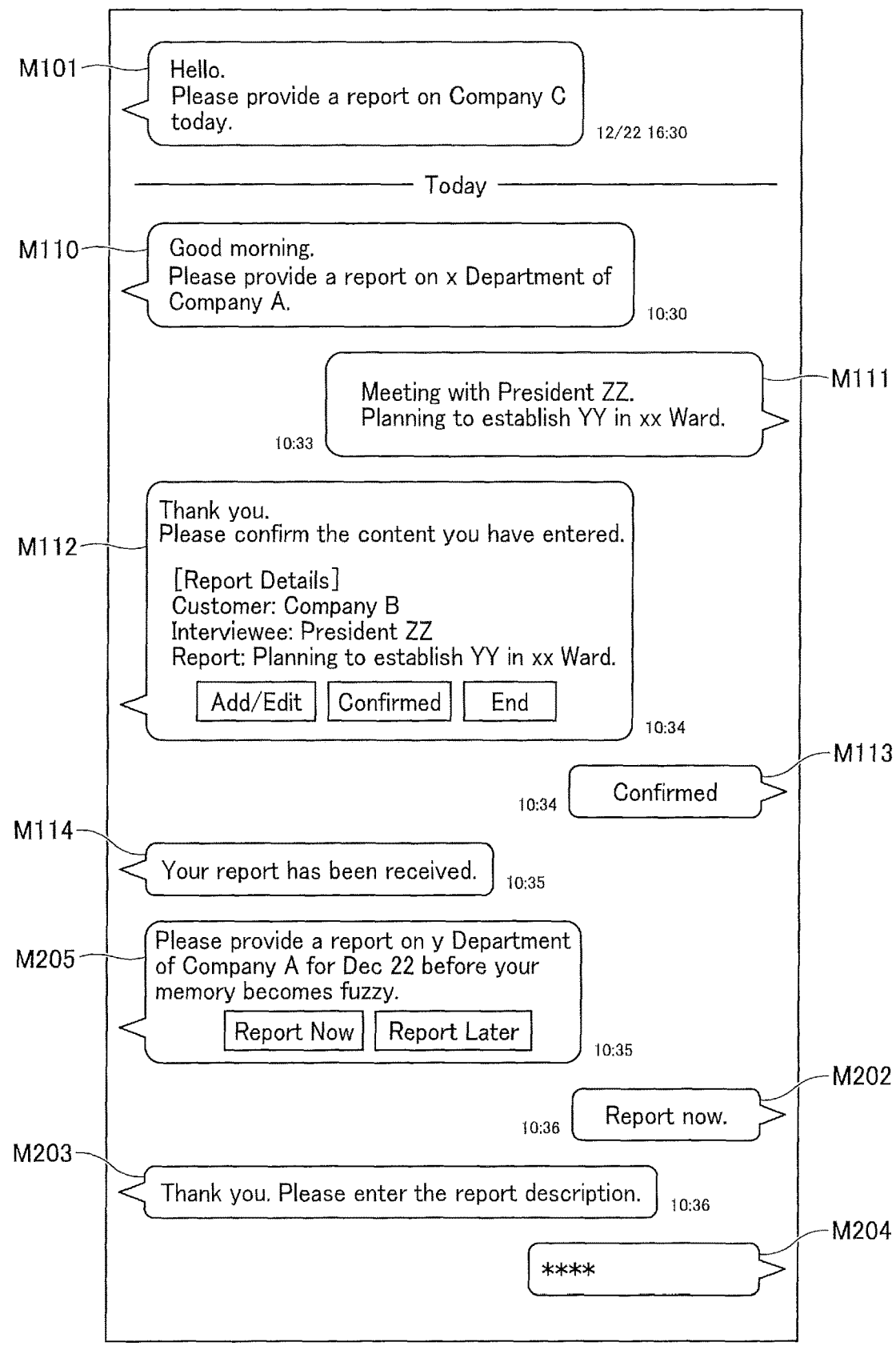
FIG. 11 is a view illustrating an example (2) of display content according to the embodiment of the present disclosure.

FIG. 11 illustrates another example (2) of the display content. The difference between FIGS. 10 and 11 is that the message M201 in FIG. 10 is replaced with a message M205 in FIG. 11. The message M205 presents a topic given in a previous question presented to the user. In one embodiment, this message includes natural language text related to the degree of memory retention of the user with respect to the topic. Various expressions, such as "before your memory becomes fuzzy" and "while your memory is still fresh", are available.

Figure 12:
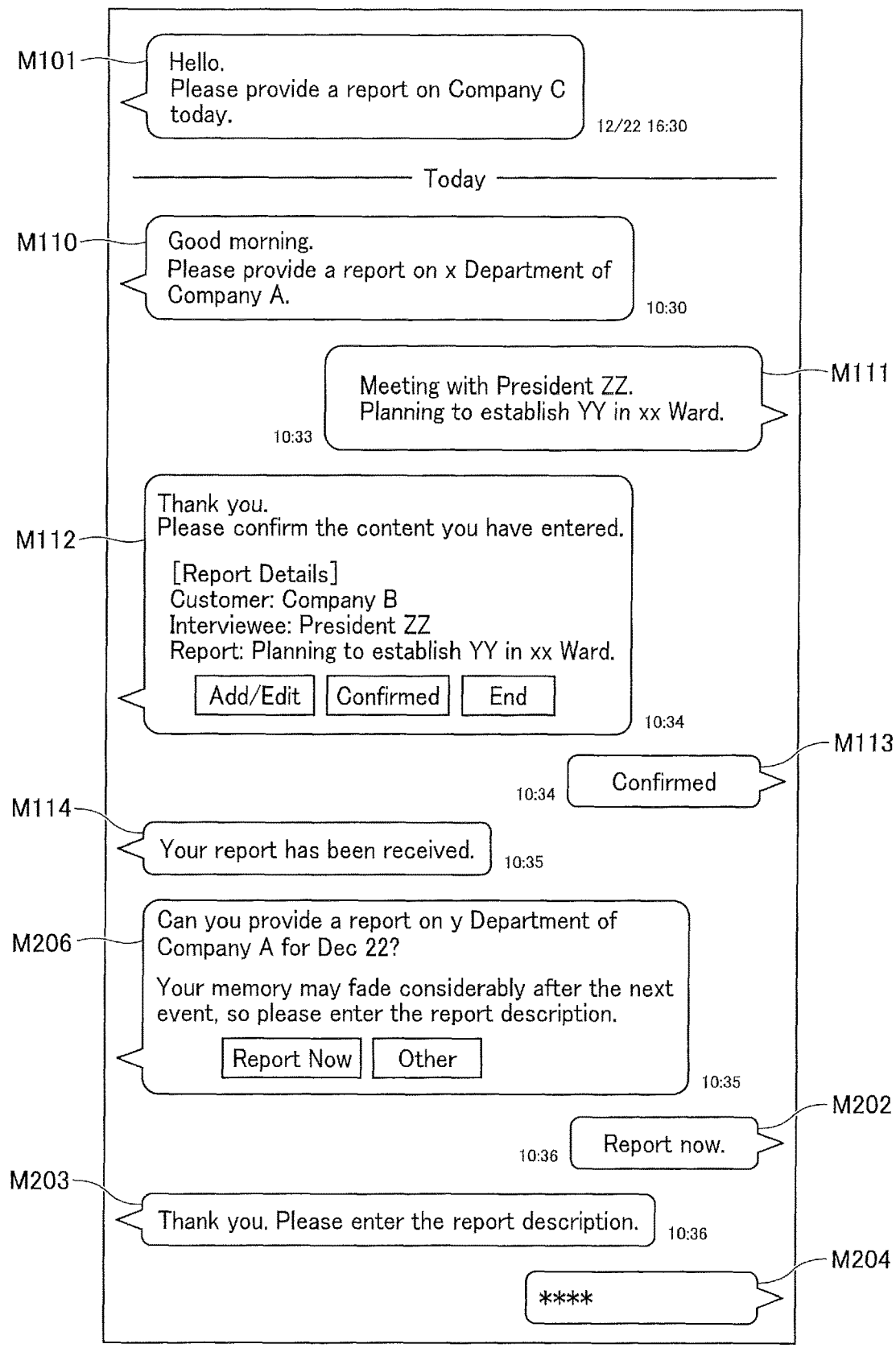
FIG. 12 is a view illustrating an example (3) of display content according to the embodiment of the present disclosure.

FIG. 12 illustrates another example (3) of the display content. The difference between FIGS. 10 and 12 is that the message M201 in FIG. 10 is replaced with a message M206 in FIG. 12. The message M206 presents a topic given in a previous question presented to the user. In one embodiment, this message includes natural language text related to the degree of memory retention of the user with respect to the topic. In some embodiments of the present disclosure, a topic to be presented is selected based on the memory retention rate at a time when the next scheduled topic is presented, and an expression describing a comparison between the state of memory at the next report time and the state of memory for reporting now is included in the message. The expression is not limited to that illustrated in FIG. 12.

Figure 13:
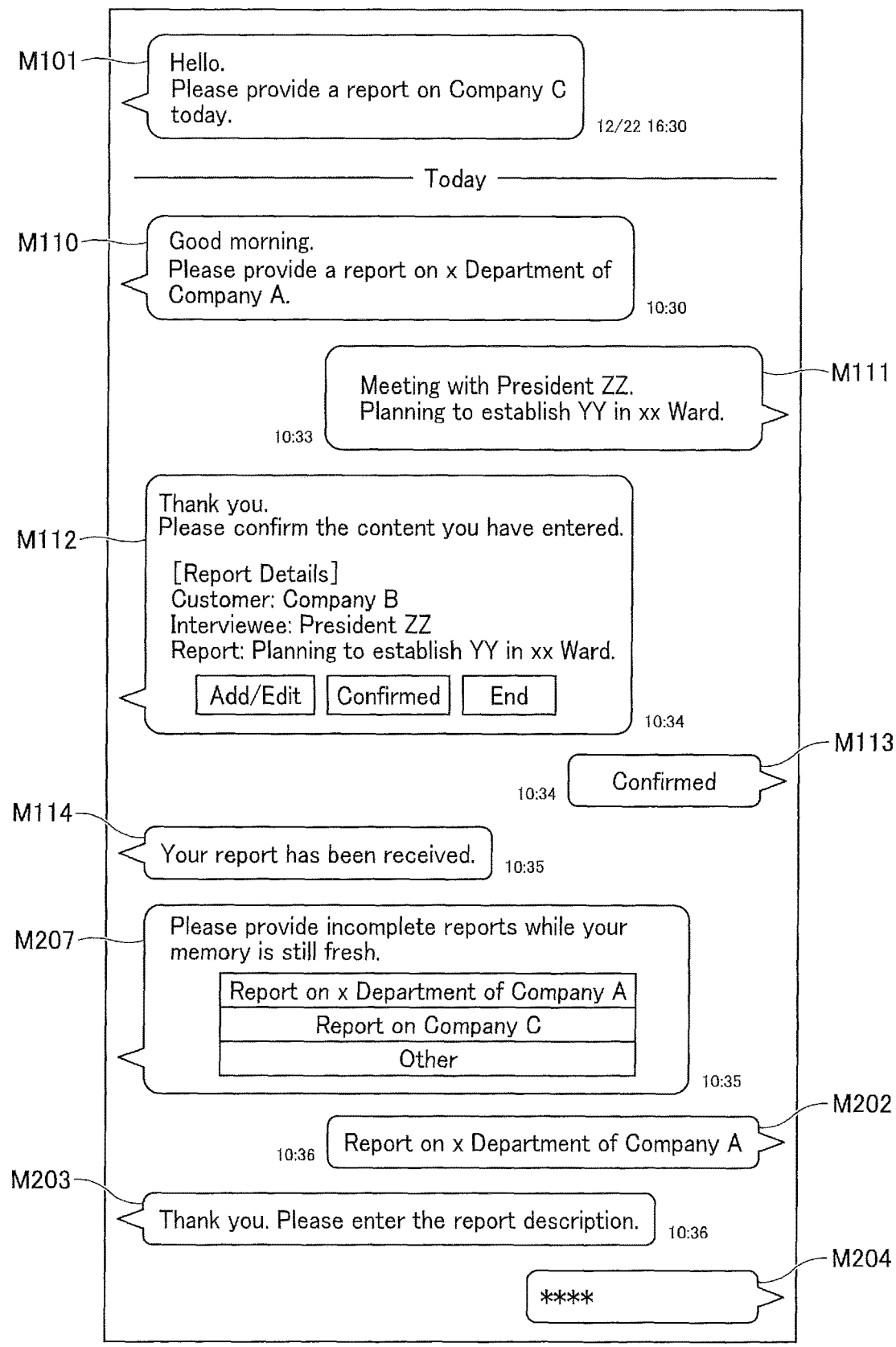
FIG. 13 is a view illustrating an example (4) of display content according to the embodiment of the present disclosure.

FIG. 13 illustrates another example (4) of the display content. The difference between FIGS. 10 and 13 is that the message M201 in FIG. 10 is replaced with a message M207 in FIG. 13. The message M207 may present one or more topics. In one embodiment, a plurality of topics may be presented in an order determined based on the memory retention levels of the topics. The topics may be displayed in the form of messages described in natural language, by button click, by radio button click, or in such a manner that candidates are selected while scrolling.

Figure 14:
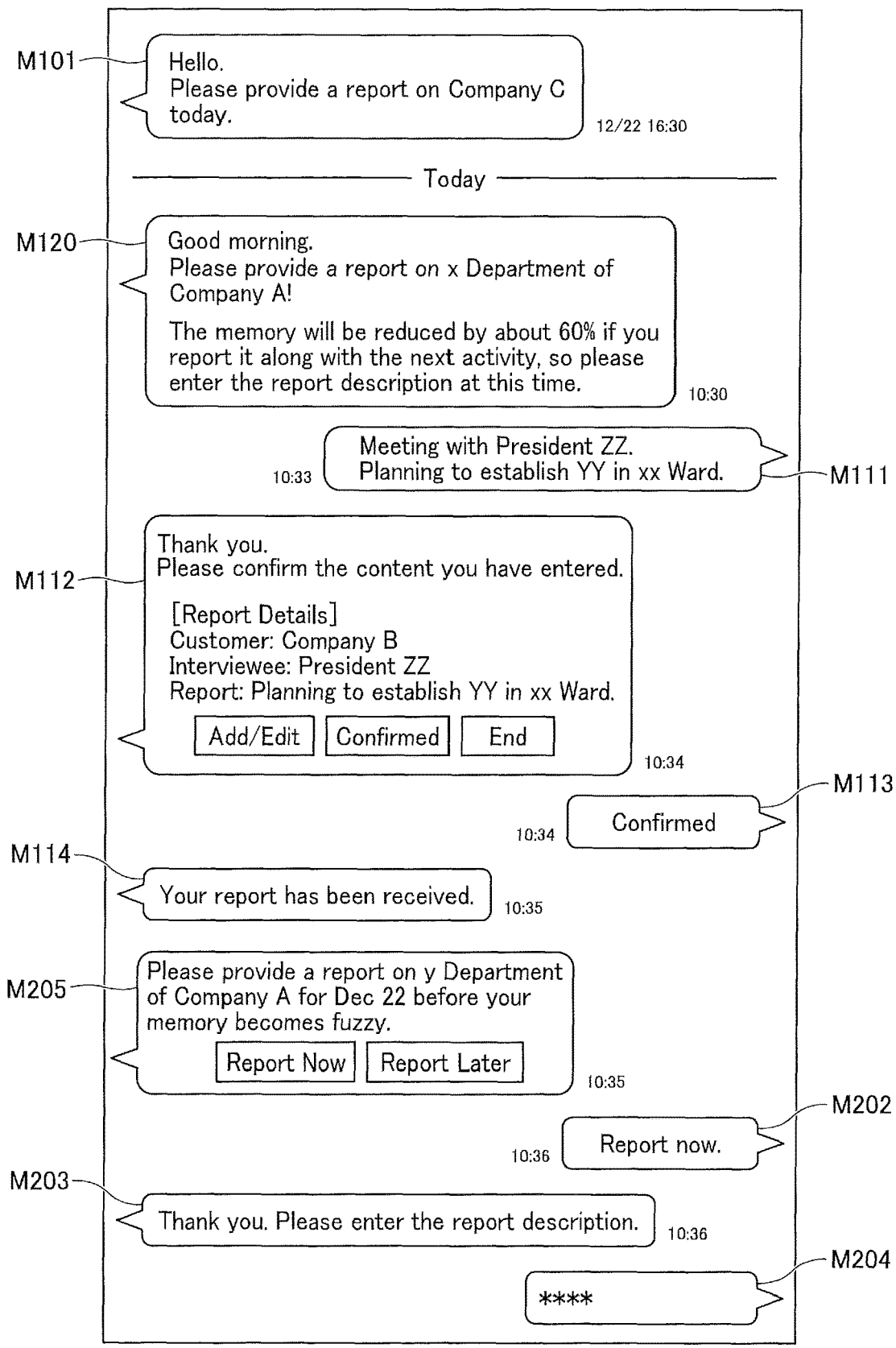
FIG. 14 is a view illustrating an example (5) of display content according to the embodiment of the present disclosure.

FIG. 14 illustrates another example (5) of the display content. The difference between FIGS. 10 and 14 is that the message M110 in FIG. 10 is replaced with a message M120 in FIG. 14. In one embodiment, the information processing system 200 presents a message using the memory retention level of the user with regard to the topic. Information related to the memory retention level may be included in a message in which the information processing system 200 first presents the topic to the user. In one embodiment, the message M120 includes natural language text indicating the difference between the degree of memory retention with regard to the topic for reporting now and the degree of memory retention with regard to the topic for reporting along with the next activity. The message may be either a text message or a voice message. An expression other than that in the example illustrated in FIG. 14 may be used.

FIG. 15 illustrates an example of topic attribute data to be used to generate the messages illustrated in FIG. 14. The example illustrated in FIG. 14 includes a message in which the degree of memory retention with regard to a topic to be presented first for reporting now is compared with the degree of memory retention with regard to the topic at the next report time. In FIG. 15, the degree of memory retention with regard to a topic to be presented first is held in the topic attribute data in a format similar to that in FIG. 5. In one embodiment, the degree of memory retention with regard to a topic to be presented first (x Department of Company A) and the degree of memory retention with regard to the topic at the next report time are included. The data format illustrated in FIGS. 5 and 15 is an example, and the JavaScript Object Notation (JSON) format or any other format may be used. Any other information may be added.

While examples of display content are illustrated in FIGS. 10 to 14, the information processing system 200 is capable of displaying a message having the following features.

Information related to the degree of a person's memory with regard to a topic or the degree to which a user retains the topic in memory, the degree of information retention, or the freshness of the topic is presented in a message including associated natural language text together with the topic.

When a plurality of topics are to be presented, messages are displayed in such a manner that the topics are presented in an order determined based on a value obtained by estimating the degree of a person's memory with regard to each topic or the degree to which a user retains each topic in memory, the degree of information retention, or the freshness of each topic.

A message for presenting a topic, a message indicating that the topic is completed, and a message for again presenting a topic previously presented to the user or presenting a topic for which the user has not completed the report are included, the message indicating that the topic is completed is displayed at a time later than the time at which the message for presenting the topic is displayed, and the message for again presenting a topic previously presented to the user or presenting a topic for which the user has not completed the report is displayed after the message indicating that the first presented topic is completed.

When two or more topics are included in messages, a message is displayed that describes, in natural language, information obtained by comparing an estimated value of the degree of a person's memory with regard to each topic, the degree to which the user retains each topic in memory, the degree of information retention, or the freshness of each topic with an estimated value of the degree of a person's memory with regard to each topic at the next interaction time, the degree to which the user retains each topic in memory at the next interaction time, the degree of information retention at the next interaction time, or the freshness of each topic at the next interaction time.

A message in natural language is displayed that includes a description of a comparison between an estimated value of the degree of a person's memory with regard to a topic at the scheduled point in time of the next interaction, the degree to which the user retains the topic in memory at the scheduled point in time of the next interaction, the degree of information retention at the scheduled point in time of the next interaction, or the freshness of the topic at the scheduled point in time of the next interaction and the state of memory for reporting at the current time.

A message is displayed that includes, as natural language text, a description of a comparison between an estimated value of the degree of a person's memory with regard to a topic at the scheduled point in time of the next interaction, the degree to which the user retains the topic in memory at the scheduled point in time of the next interaction, the degree of information retention at the scheduled point in time of the next interaction, or the freshness of the topic at the scheduled point in time of the next interaction and the state of memory for reporting at the current time.

As described above, according to an embodiment of the present disclosure, an information processing system is capable of holding a topic previously presented to a user and information on the degree of memory retention of the user with respect to the topic or the freshness of the topic, and selecting or determining a topic to be presented based on the information on the degree of memory retention of the user with respect to the topic or the freshness of the topic.

That is, the degree to which a topic to be presented to the user, for example, a topic on which the user has not responded to an interaction or has interrupted or terminated an interaction, is remembered or retained in memory is estimated based on the relationship between human memory capacity and time, and the time when the topic is presented is determined. As a result, it is possible to present a topic for which the report of the result is not completed to the user while the topic is remembered to a certain extent or more to allow the user to easily respond and to collect a report.

In addition, the information processing system is capable of presenting a previously presented topic at a time when the user is likely to respond. For example, the information processing system is capable of presenting to the user a topic previously presented to the user, when or immediately after the current topic of the interaction with the user is completed.

In other words, the information processing system interacting with the user on a given topic presents, at the time of completion of the given topic, a topic for which the report of the result is not completed, thereby presenting the topic at a time when the user is likely to respond. As a result, it is possible to easily obtain a response from the user and to collect a report.

Further, a topic to be presented first may include no degree of retention or may include one or more types of degrees of retention, and a topic to be presented next may include at least one type of estimated degree of retention of information.

While some embodiments of the present disclosure have been described, the present disclosure is not limited to such embodiments and may be modified and substituted in various ways without departing from the spirit of the present disclosure.

For example, the example configuration in the functional block diagram illustrated in FIG. 3 is divided in accordance with main functions to facilitate understanding of the processes performed by the information processing system 200 and the terminal apparatus 300. The scope of the present disclosure is not limited by how the process units are divided or by the names of the process units. The processes performed by the information processing system 200 and the terminal apparatus 300 may be divided into more process units in accordance with the content of the processes. Further, the processes may be divided into process units such that each process unit includes more processes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The group of apparatuses described above is merely representative of one of a plurality of computing environments for implementing the embodiments disclosed herein. In one embodiment, the service providing system includes a plurality of computing devices such as server clusters. The plurality of computing devices communicate with one another through any type of communication link including, for example, a network or a shared memory, and perform the operations disclosed herein.

According to one or more embodiments, a non-transitory computer-executable medium storing a program storing instructions is provided, which, when executed by one or more processors of an information processing apparatus that collects from a terminal apparatus information on a topic input by a user, causes the one or more processor to perform an information processing method. The information processing method includes determining, based on topic data including a plurality of topics for which collection of information input by the user is not completed, based on a content or a result of a first topic, a second topic included in the topic data as a topic to be presented to the user. The information processing method includes transmitting a message including the second topic to the terminal apparatus, the terminal apparatus being used by the user.

In the related art, the failure to present a topic for which an input of information is received from a user to the user in a manner that the user can easily respond on the topic may make it difficult to collect information on the topic.

According to one or more embodiments of the present disclosure, a service providing system is provided that presents a topic for which an input of information is received from a user to the user at a time when the user can respond on the topic.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A service providing system comprising:
 a teiminal apparatus including first circuitry configured to display a message asking a user to input information related to a topic among a plurality of topics; and
 an information processing apparatus, including second circuitry configured to collect information related to the topic input by the user from the terminal apparatus, and holding topic data,
 wherein the topic data includes:
 a collection status for each of the plurality of topics,
 a first index, for each of the plurality of topics, indicating a degree of memory retention of the user with regard to the topic, the first index being calculated based on a first time at which the message asking the user to input information related to the topic is displayed and a second index, for each of the plurality of topics, indicating a degree of memory retention of the user with regard to the topic, the second index being calculated based on a second time at which the message asking the user to input information related to the topic is displayed, the second time being after the first time, wherein the second circuitry of the information processing apparatus being further is configured to:

transmit a first message asking the user to input information related to a first topic among the plurality of topics to the terminal apparatus, the collection status of the first topic being incomplete, update the collection status of the first topic based on information collected from the terminal apparatus, upon the collection status of the first topic being updated from incomplete to complete, transmit a second message indicating that the collection status of the first topic is complete to the terminal apparatus, calculate the first index and the second index for each of a plurality of topic candidates, the collection status for each of the plurality of topic candidates being incomplete, update, for each of the plurality of topic candidates, the first index and the second index based on the calculation, determine, based on the updated first index and the updated second index, at least one topic among the plurality of topic candidates as a second topic from which the information processing apparatus collects information after the first topic, and transmit a third message to the terminal apparatus, the third message being a message asking the user to input information related to the second topic, wherein the first circuitry of the terminal apparatus is configured to:

receive the first message, the second message, and the third message from the information processing apparatus, and display the first message, the second message, and the third message on a screen, and wherein the second circuitry is further configured to:

upon displaying the first message on the screen, perform, for each of the plurality of topic candidates, the calculation of the first index and the second index, the updating the first index and the second index, and the determination of the second topic, and transmit the third message to the terminal apparatus such that the first circuitry can display the third message immediately after the second message.

2. The service providing system according to claim 1, wherein the second circuitry of the information processing apparatus is further configured to determine at least one topic among the plurality of topic candidates for which the first index is greater than or equal to a predetermined threshold value, the at least one topic being a topic for which the second index is less than the predetermined threshold value.

3. The service providing system according to claim 2, wherein in a case that a plurality of topics is determined as second topics, the third message is a message asking the user to input information related to the second topics in descending order of the degree of memory retention indicated by the first index.

4. The service providing system according claim 1, wherein the third message including the second topic comprises a comparison between the first index for the second topic and the second index for the second topic.

5. The service providing system according to claim 1, wherein a message asking the user to input information related to at least one of the plurality of topic candidates is previously displayed before the collection status of the first topic is updated from incomplete to complete.

6. The service providing system according to Claim 1, wherein in a case that a plurality of topics is determined as second topics, the third message is a message asking the user to input information related to the second topics in descending order of the degree of memory retention indicated by the first index or the second index.

7. The service providing system according to claim 6, wherein the message includes the first index and the second index to the terminal apparatus, and wherein the first circuitry of the terminal apparatus is further configured to display the first index and the second index together with the plurality of second topics.

8. The service providing system according to claim 6, wherein the second circuitry of the information processing apparatus is further configured to transmit to the terminal apparatus the message including a comparison between the first index and the second index.

9. An information processing apparatus that collects from a terminal apparatus information on a topic among a plurality of topics input by a user and holds topic data, the topic data including a collection status for each of the plurality of topics, a first index, for each of the plurality of topics, indicating a degree of memory retention of the user with regard to the topic, the first index being calculated based on a first time at which a message asking the user to input information related to the topic is displayed and a second index, for each of the plurality of topics, indicating a degree of memory retention of the user with regard to the topic, the second index being calculated based on a second time at which the message asking the user to input information related to the topic is displayed, the second time being after the first time, the information processing apparatus comprising circuitry configured to:

transmit a first message asking the user to input information related to a first topic among the plurality of topics to the terminal apparatus, the collection status of the first topic being incomplete, update the collection status of the first topic based on information collected from the terminal apparatus, upon the collection status of the first topic being updated from incomplete to complete, transmit a second message indicating that the collection status of the first topic is complete to the terminal apparatus, calculate the first index and the second index for each of a plurality of topic candidates, the collection status for each of the plurality of topic candidates being incomplete, update, for each of the plurality of topic candidates, the first index and the second index based on the calculation, determine, based on the updated first index and the updated second index, at least one topic among the plurality of topic candidates as a second topic from which the information processing apparatus collects information after the first topic, and transmit a third message to the terminal apparatus, the third message being a message asking the user to input information related to the second topic, and wherein the circuitry is further configured to:

upon displaying the first message on a screen, perform, for each of the plurality of topic candidates, the calculation of the first index and the second index, the updating the first index and the second index, and the determination of the second topic, and transmit the third message to the terminal apparatus such that the third message can be displayed immediately after the second message is displayed.

10. An information processing method performed by an information processing apparatus that collects from a terminal apparatus information on a topic among a plurality of topics input by a user and holds topic data, the topic data including a collection status for each of the plurality of topics, a first index, for each of the plurality of topics, indicating a degree of memory retention of the user with regard to the topic, the first index being calculated based on a first time at which a message asking the user to input information related to the topic is displayed and a second index, for each of the plurality of topics, indicating a degree of memory retention of the user with regard to the topic, the second index being calculated based on a second time at which the message asking the user to input information related to the topic is displayed, the second time being after the first time, the information processing method comprising:

transmitting a first message asking the user to input information related to a first topic among the plurality of topics to the terminal apparatus, the collection status of the first topic being incomplete, updating the collection status of the first topic based on information collected from the terminal apparatus, upon the collection status of the first topic being updated from incomplete to complete, transmitting a second message indicating that the collection status of the first topic is complete to the terminal apparatus, calculating the first index and the second index for each of a plurality of topic candidates, the collection status for each of the plurality of topic candidates being incomplete, updating, for each of the plurality of topic candidates, the first index and the second index based on the calculation, determining, based on the updated first index and the updated second index, at least one topic among the plurality of topic candidates as a second topic from which the information processing apparatus collects information after the first topic, transmitting a third message to the terminal apparatus, the third message being a message asking the user to input information related to the second topic, upon displaying the first message on a screen, performing, for each of the plurality of topic candidates, the calculation of the first index and the second index, the updating the first index and the second index, and the determination of the second topic, and transmitting the third message to the terminal apparatus such that the third message can be displayed immediately after the second message is displayed.

\* \* \* \* \*